$\text{US}009654664\text{B}2$

(12) United States Patent
Okamoto

(10) Patent No.: US 9,654,664 B2
(45) Date of Patent: May 16, 2017

(54) FACSIMILE DEVICE CONFIGURED TO DETECT AN IDENTIFICATION IMAGE IN A RECEIVED FAX, NON-TRANSITORY STORAGE MEDIUM, COMMUNICATION SYSTEM CONFIGURED TO PERFORM SAME

(71) Applicant: Takuya Okamoto, Kanagawa (JP)

(72) Inventor: Takuya Okamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/820,705

(22) Filed: Aug. 7, 2015

(65) Prior Publication Data

US 2016/0050336 A1    Feb. 18, 2016

(30) Foreign Application Priority Data

Aug. 13, 2014  (JP) ................................. 2014-164765

(51) Int. Cl.
*G06F 3/12*     (2006.01)
*H04N 1/32*    (2006.01)

(52) U.S. Cl.
CPC ..... *H04N 1/32379* (2013.01); *H04N 1/32101* (2013.01); *H04N 1/32432* (2013.01); *H04N 2201/0094* (2013.01)

(58) Field of Classification Search
CPC ....................... H04N 1/32379; H04N 1/32432
See application file for complete search history.

(56) References Cited

U.S. PATENT DOCUMENTS

| | | | |
|---|---|---|---|
| 7,539,150 B2* | 5/2009 | Lauer .................. | H04L 67/1097 370/254 |
| 2004/0165221 A1 | 8/2004 | Motohashi et al. | |
| 2007/0088849 A1 | 4/2007 | Suzuki et al. | |
| 2010/0245904 A1* | 9/2010 | Nishiyama ......... | H04N 1/00214 358/1.15 |
| 2011/0222113 A1* | 9/2011 | Adachi .............. | H04N 1/32128 358/1.15 |
| 2013/0208310 A1* | 8/2013 | Nakashima ........ | H04N 1/00244 358/1.15 |

FOREIGN PATENT DOCUMENTS

| | | |
|---|---|---|
| JP | 2004-236081 | 8/2004 |
| JP | 2007-114879 | 5/2007 |

* cited by examiner

*Primary Examiner* — Benjamin O Dulaney
(74) *Attorney, Agent, or Firm* — Harness, Dickey & Pierce, P.L.C.

(57) ABSTRACT

Disclosed is a non-transitory storage medium storing a communication program for causing a processor to execute a method including steps of receiving an input of facsimile data; determining whether an identification image is added to the received facsimile data; a step of retrieving, when the identification image is added, information indicating an association with different facsimile data from the identification image that is added to the facsimile data; storing the received facsimile data in a predetermined memory, wherein the received facsimile data is associated with the different facsimile data based on the retrieved information; generating, when the identification image is not added, the information indicating the association with the different facsimile data; and adding, to the facsimile data, the identification image that is generated based on the information indicating the association with the different facsimile data.

13 Claims, 16 Drawing Sheets

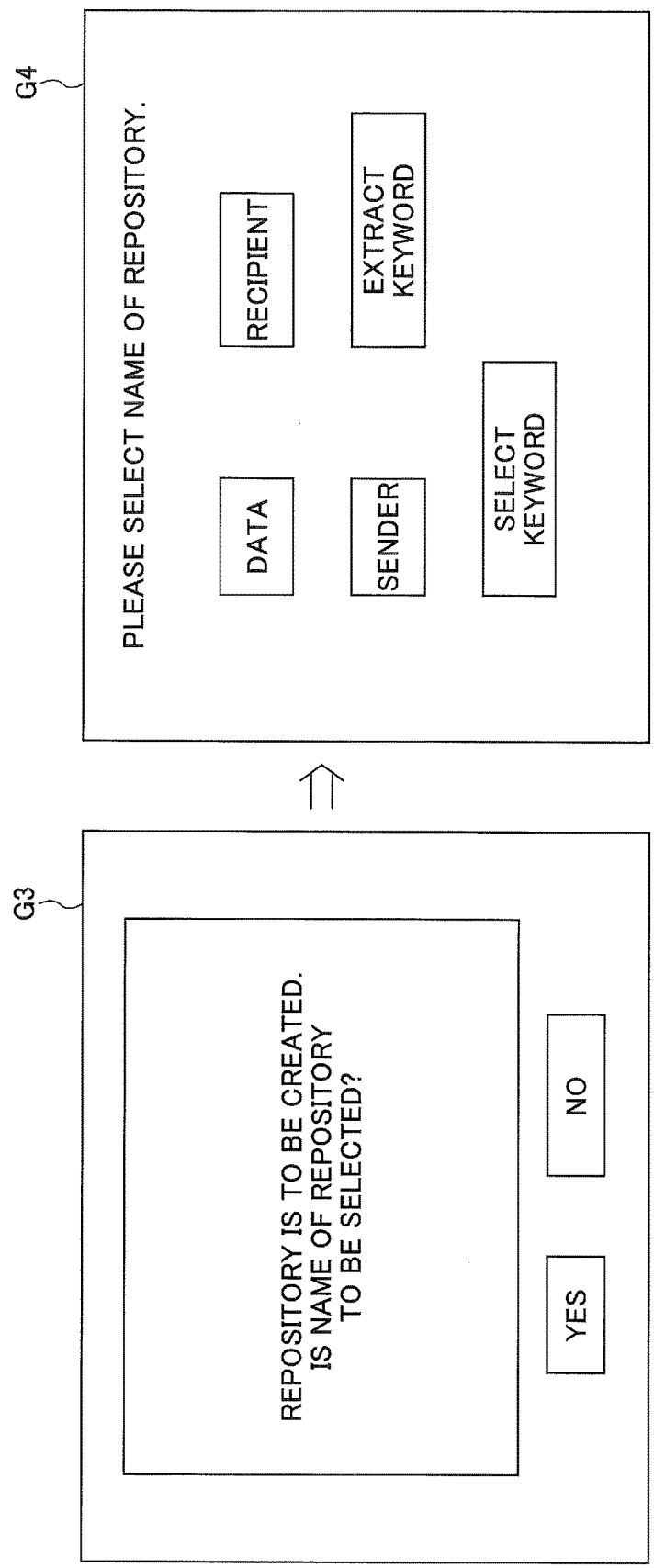

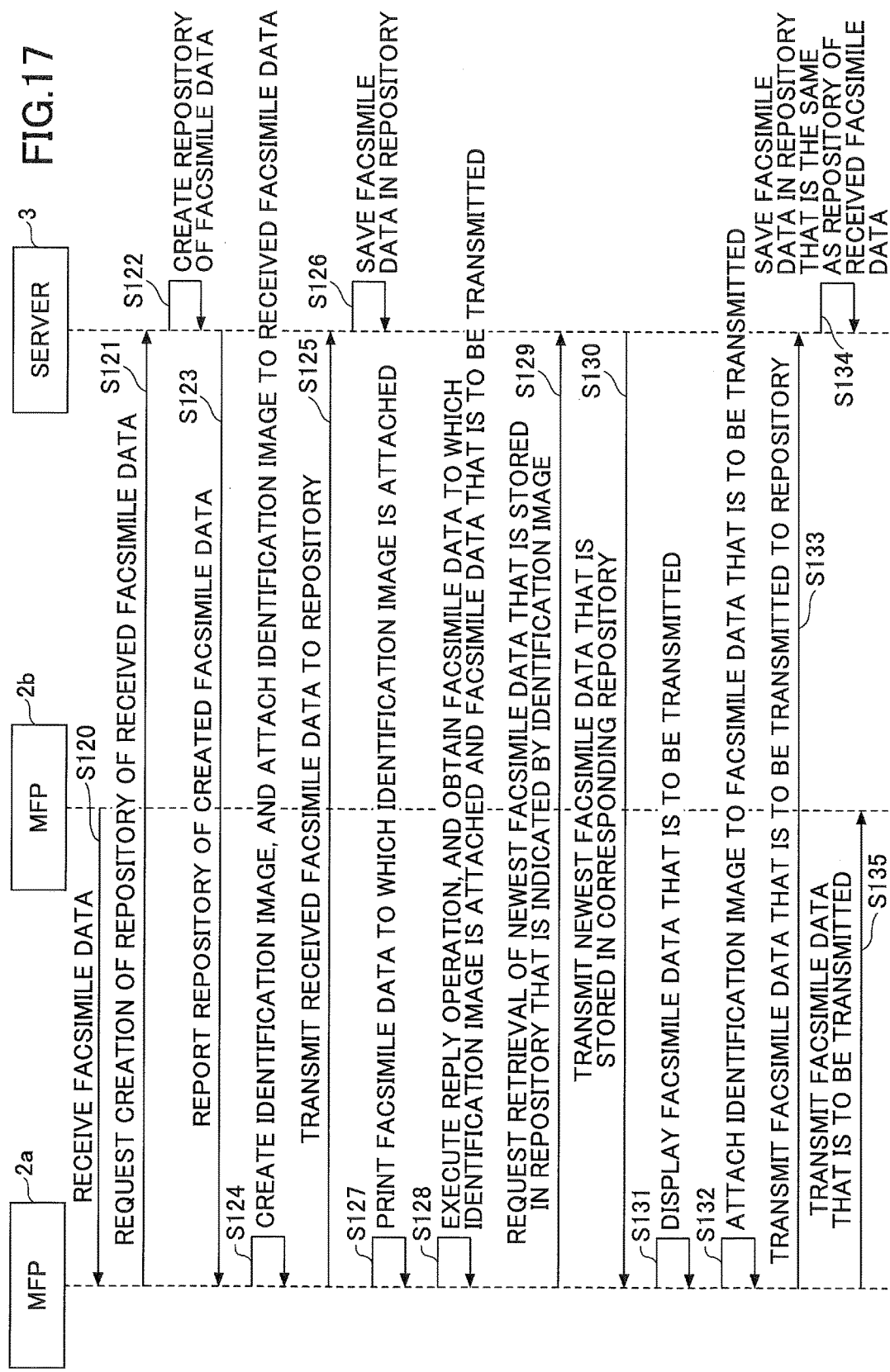

FACSIMILE DEVICE CONFIGURED TO DETECT AN IDENTIFICATION IMAGE IN A RECEIVED FAX, NON-TRANSITORY STORAGE MEDIUM, COMMUNICATION SYSTEM CONFIGURED TO PERFORM SAME

BACKGROUND OF THE INVENTION

Field of the Invention

The present invention relates to a non-transitory storage medium storing a communication program, a facsimile device, and a communication system.

Description of the Related Art

A technique has been known that is for a management device to store and to manage communicated facsimile data.

For example, a technique has been known that is for a management device to sort sets of facsimile data that are to be forwarded to corresponding departments, depending on contents of the received facsimile data (cf. Patent Document 1 (Japanese Unexamined Patent Publication No. 2004-236081), for example).

SUMMARY OF THE INVENTION

According to the above-described technique, the received facsimile data can be easily sorted. However, with the above-described technique, sets of facsimile data that are communicated with a destination may not be managed in a manner in which the sets of facsimile data are associated with each other.

Embodiments of the present invention have been developed in view of the above-described problem. There is a need for a facsimile device, a communication program, and a communication system that can manage sets of related facsimile data by associating the sets of the related facsimile data with each other.

According to an aspect of the present invention, there is provided a non-transitory storage medium storing a communication program for causing a processor to execute a method including a step of receiving an input of facsimile data; a step of determining whether an identification image is added to the received facsimile data; a step of retrieving, in response to detecting that the identification image is added, information indicating an association with different facsimile data from the identification image that is added to the facsimile data; a step of storing the received facsimile data in a predetermined memory, wherein the received facsimile data is associated with the different facsimile data based on the retrieved information; a step of generating, in response to detecting that the identification image is not added, the information indicating the association with the different facsimile data; and a step of adding, to the facsimile data, the identification image that is generated based on the information indicating the association with the different facsimile data.

According to another aspect of the present invention, there is provided a communication system including a facsimile device and an information processing device, wherein the facsimile device and the information processing device are configured to connect with each other through a network. The facsimile device includes a receiver configured to receive an input of facsimile data; a determining unit configured to determine whether an identification image is attached to the facsimile data that is received by the receiver; a retrieval unit configured to retrieve, in response to determining by the determining unit that the identification image is added, information indicating an association with different facsimile data from the identification image that is added to the facsimile data; a storage unit configured to store the facsimile data that is received by the receiver in the predetermined memory, wherein the facsimile data is associated with the different facsimile data based on the information that is retrieved by the retrieval unit; and an adding unit configured to generate, in response to determining by the determining unit that the identification image is not added, the information indicating the association with the different facsimile data, and configured to add, to the facsimile data, the identification image that is generated based on the information indicating the association with the different facsimile data.

According to another aspect of the present invention, there is provided a facsimile device including a receiver configured to receive an input of facsimile data; a determining unit configured to determine whether an identification image is attached to the facsimile data that is received by the receiver; a retrieval unit configured to retrieve, in response to determining by the determining unit that the identification image is added, information indicating an association with different facsimile data from the identification image that is added to the facsimile data; a storage unit configured to store the facsimile data that is received by the receiver in a predetermined memory, wherein the facsimile data is associated with the different facsimile data based on the information that is retrieved by the retrieval unit; and an adding unit configured to generate, in response to determining by the determining unit that the identification image is not added, the information indicating the association with the different facsimile data, and configured to add, to the facsimile data, the identification image that is generated based on the information indicating the association with the different facsimile data.

According to the embodiments of the present invention, sets of related facsimile data can be associated with each other, and the sets of the related facsimile data that are associated with each other can be managed.

Other objects, features and advantages of the present invention will become more apparent from the following detailed description when read in conjunction with the accompanying drawings.

BRIEF DESCRIPTION OF THE DRAWINGS

FIG. 16 is an image diagram showing an example of a screen that is to be displayed during setting of a name of facsimile data; and FIG. 17 is a sequence diagram showing a flow between reception of facsimile data and transmission of a reply to the facsimile data in a modified example.

DETAILED DESCRIPTION OF THE PREFERRED EMBODIMENTS

A preferred embodiment of the present invention is explained below.

<Outline of a System>

Figure 1:
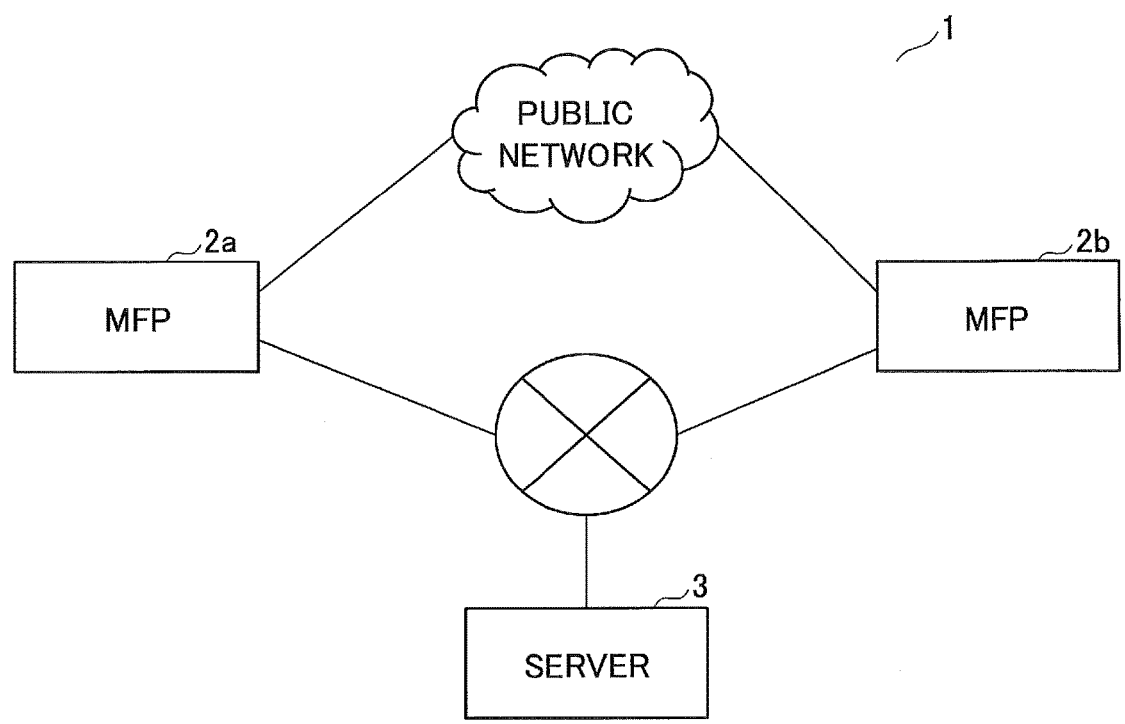
FIG. 1 is a diagram showing an example of a system configuration of a communication system according to an embodiment.

FIG. 1 is an example of a system configuration of a communication system 1 according to an embodiment.

In the communication system 1, multifunction peripherals 2a, 2b, . . . are connected through a public network. When the MFPs 2a and 2b are not individually distinguished, it is referred to as the MFP 2. The MFPs 2a and 2b and a server 3 are connected through a network. Note that the MFP 2 and the server 3 may be connected through a transmission line.

The MFP 2a can execute facsimile communication with the MFP 2b that is connected to the MFP 2a via the public network. The MFP 2 can communicate facsimile data with a destination. In such a case, the MFP 2 can attach an identification image, such as a one-dimensional bar code or a two-dimensional bar code, to the facsimile data. The MFP 2 can store facsimile data that is to be transmitted to another MFP 2 or facsimile data that is received from another MFP 2 in the server 3 that is connected to the MFP 2 through the network. The MFP 2 can be a communication device including a facsimile function.

The server 3 can create a repository, such as a folder for storing facsimile data, in response to a request for storing facsimile data from the MFP 2, for example. The server 3 can store data that is received from the MFP 2 in a corresponding folder. The server 3 can be an information processing device, such as a personal computer (PC). Here, a configuration is shown such that the server 3 creates a repository and stores facsimile data. However, the embodiment is not limited to this configuration, and a configuration may be considered such that the MFP 2 creates a repository in a main body of the MFP 2 and the MFP 2 stores facsimile data in the repository.

<Hardware Configuration>

<<MFP>>

Figure 2:
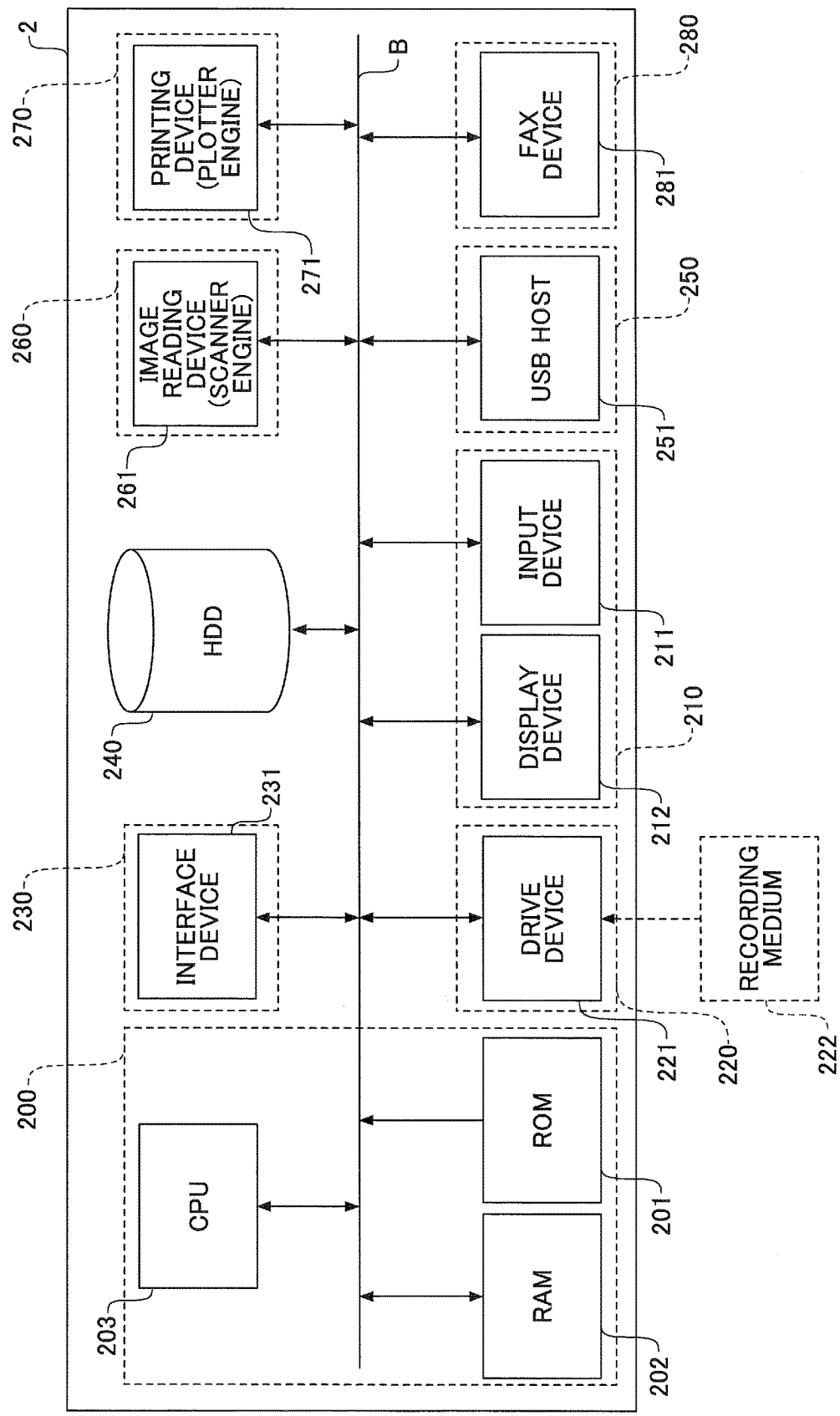
FIG. 2 is a diagram showing an example of a hardware configuration of a multifunction peripheral (MFP) according to an embodiment.

FIG. 2 is a diagram showing an example of a hardware configuration of the MFP 2 according to the embodiment.

The MFP 2 may include a controller 200; an operations panel 210; a storage medium interface (I/F) 220; a data communication I/F 230; a hard disk drive (HDD) 240; a Universal Serial Bus (USB) I/F 250; a scanner 260; a plotter 270; and a facsimile device 280. These components can be mutually connected by a Peripheral Component Interconnect (PCI) bus B.

The controller 200 may include a Read Only Memory (ROM) 201; a Random Access Memory (RAM) 202; and a Core Process Unit (CPU) 203. The ROM 201 can store a program that is to be executed when the MFP 2 is activated and various types of data. The RAM 202 can temporarily store various types of programs and data that are read out from the ROM 201 or the HDD 240.

The operations panel 210 may include an input device 211 and a display device 212. The input device 211 may be formed of hardware keys, for example, and the input device 211 can be used for inputting various operation signals to the MFP 2. The display device 212 may include a display. For example, the display device 212 may display various types of information related to an image creation operation, for example.

The storage medium I/F 220 may include a drive device 221. In response to detecting that a recording medium 222 is attached to the drive device 221, various types of data that are stored in the recording medium 222 are read by the drive device 221 and stored in the HDD 240 through the drive device 221.

The data communication I/F 230 may include an interface device 231. The data communication I/F 230 can be an interface for connecting the MFP 2 to a data transmission line, such as a network N.

The HDD 240 can store various types of data that are handled by the MFP 2, such as received document data and read image data. The HDD 240 can manage these types of data by using a predetermined file system or a database (DB). The various types of data that are stored in the HDD 240 may include, for example, electronic data that is recorded by an external device, such as a smartphone or a digital camera. In such a case, the data may be provided to the MFP 2 by using the recording medium 222, such as an SD card; or the data may be uploaded through a network or the like, that is a data transmission line.

The USB I/F 250 may include a Universal Serial Bus (USB) host 251. The USB host 251 can be connected to various types devices through a USB cable. The USB host 251 may include a function for controlling a physical/electrical I/F for communicating with various types of devices; and a function for controlling a USB protocol.

The scanner 260 may include an image reading device 261. The scanner 260 can optically read an original document that is disposed on a surface to be read, and thereby creates image data.

The plotter 270 may include a printing device 271. The plotter 270 may print a bit map image on a recording paper sheet by an electrophotographic processing method.

The facsimile device 280 can be used for communicating image information through a telephone line.

<<Server>>

Figure 3:
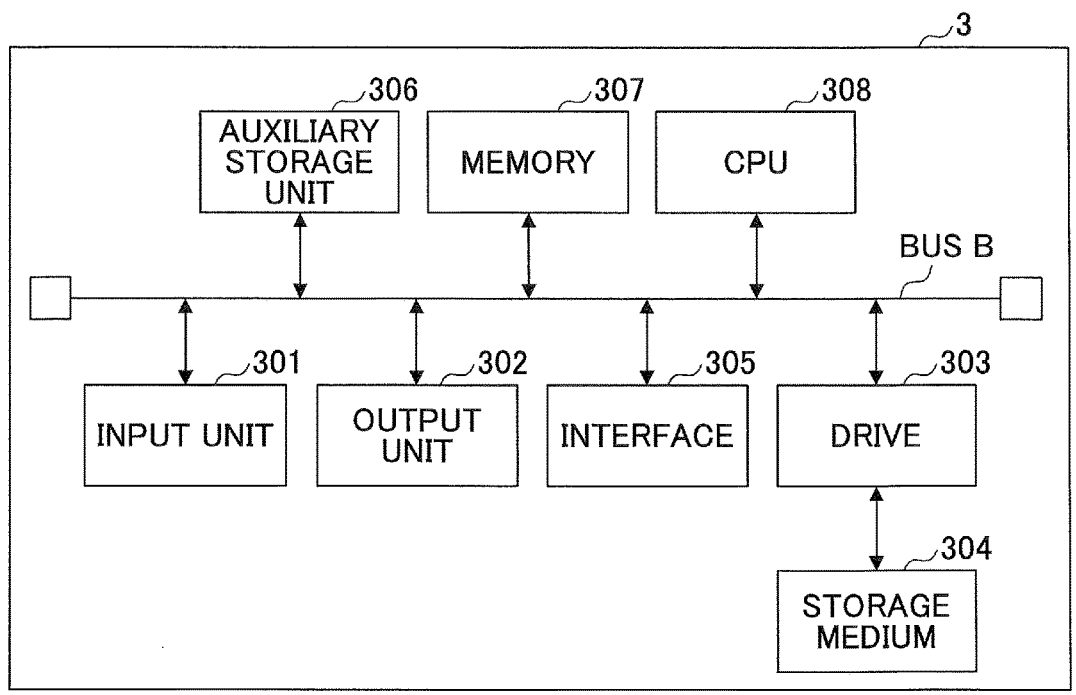
FIG. 3 is a diagram showing an example of a hardware configuration of a server according to an embodiment.

FIG. 3 is a diagram showing an example of a hardware configuration of the server 3 according to the embodiment.

The server 3 may include an input unit 301; an output unit 302; a drive 303; an interface 305; an auxiliary storage unit 306; a memory 307; and a CPU 308. These components can be mutually connected through a bus B. A storage medium 304 may be connected to the drive 303.

The input unit 301 can be used for inputting various types of signals. The input unit 301 may be formed of a keyboard and a mouse, for example.

The output unit 302 is formed of a display, for example. The output unit 302 can be used for displaying various types of windows and data, for example.

The drive 303 can be used for reading out data from a storage medium, or writing data to a storage medium.

As for the storage medium 304, various types of storage media can be used, such as a Compact Disk Read Only Memory (CD-ROM), a magneto-optical disk, and a semiconductor memory, e.g., a flash memory.

The interface 305 can be used for connecting to a network. The interface 305 may be formed of a modem, a LAN card, and so forth.

The auxiliary storage unit 306 can be used for storing a program, a file, data, and so forth that may be required for executing a process. The auxiliary storage unit 306 may be formed of a hard disk drive.

The memory 307 can be used for temporarily storing a program and information for executing data processing. The memory 307 may be formed of a semiconductor memory and so forth.

The CPU 308 can be used for executing various types of processes in accordance with programs that are stored in the memory 307.

In response to detecting that the storage medium 304 that stores a program is attached to the drive 303, the program in the storage medium 304 can be installed in the auxiliary storage unit 306 via the drive 303. A method of installing a program is not limited to the method of reading out a program that is stored in the storage medium 304. A program may be installed by downloading the program through a network.

In response to an activation request from the CPU 308, the memory 307 can read out a program from the auxiliary storage unit 306, and the program can be stored in the memory 307. The CPU 308 can execute various types of data processing in accordance with programs that are stored in the memory 307.

<Functional Configuration>

Figure 4:
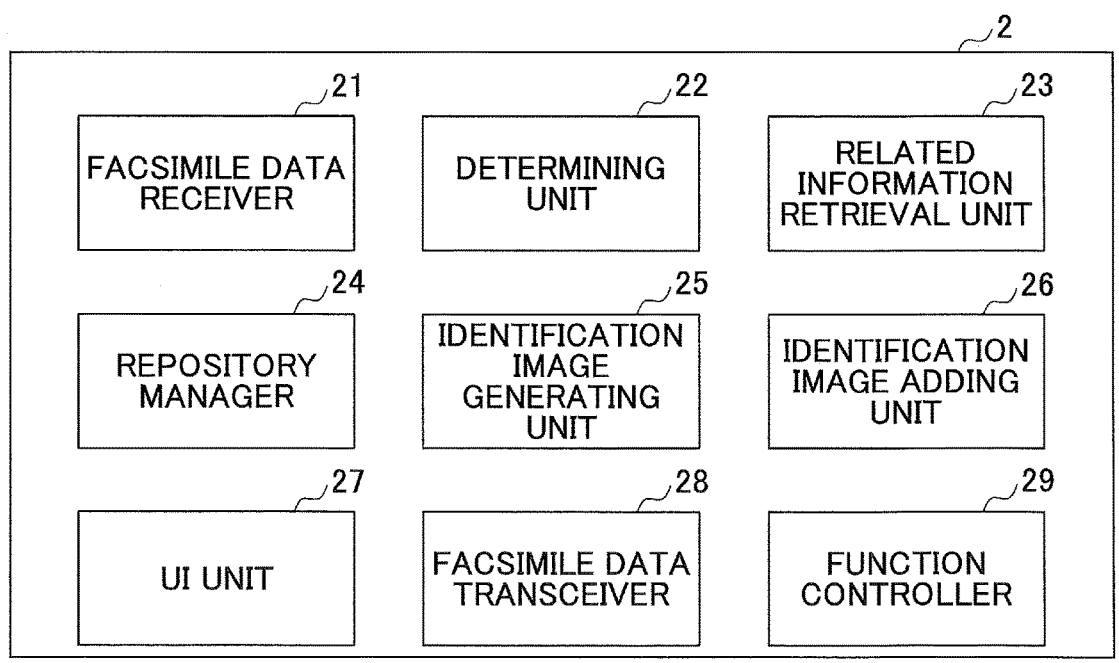
FIG. 4 is a diagram showing an example of a functional configuration of the MFP according to an embodiment.

FIG. 4 is a diagram showing an example of a functional configuration of the MFP 2 according to the embodiment. The MFP 2 may include a facsimile data receiver 21; a determining unit 22; a related information retrieval unit 23; a repository manager 24; an identification image generating unit 25; an identification image adding unit 26; a UI unit 27; a facsimile data transceiver 28; and a function controller 29.

The facsimile data receiver 21 can obtain facsimile data that is to be transmitted or facsimile data that is received. The facsimile data receiver 21 can obtain facsimile data from data that is obtained from a medium, such as a printed paper sheet, or from data that is obtained from a PC.

The determining unit 22 can determine whether the facsimile data that is received by the facsimile data receiver 21 includes an identification image, such as a two-dimensional bar code. In response to detecting that an identification image is included in facsimile data that is received by the facsimile data receiver 21, the determining unit 22 can request the related information retrieval unit 23 to retrieve information on a repository and tag information that indicate relationship with different facsimile data. Note that the information on the repository can be information on a folder that indicates a location where facsimile data is stored. The tag information can be information that indicates attributes of facsimile data, such as a sender of the facsimile data and a title of the facsimile data.

In response to detecting that no identification image is included in facsimile data that is received by the facsimile data receiver 21, the determining unit 22 can determine whether facsimile data exists that is related to the facsimile data received by the facsimile data receiver 21. The determination of the existence of the related facsimile data can be made in such a manner that a communication history that is stored in the main body of the MFP 2 or a set of facsimile data that is stored in the server 3 is displayed on the operations panel 210 or the like, and let a user select one, for example.

In response to detecting that a user selects the related facsimile data, the determining unit 22 can request the related information retrieval unit 23 to retrieve, from an identification image of the corresponding facsimile data, information that indicates a relationship with the facsimile data that is obtained by the facsimile data receiver 21.

In response to detecting that there is no related facsimile data, the determining unit 22 can request creation of a repository from the repository manager 24.

The related information retrieval unit 23 can retrieve information indicating a relationship with different facsimile data from an identification image that is included in the facsimile data. In accordance with the information indicating the relationship with the different facsimile data that is retrieved from the identification information, the related information retrieval unit 23 may request the repository manager 25 to associate the facsimile data that is received by the facsimile data receiver 21 with the different facsimile data and to store the facsimile data that is received by the facsimile data receiver 21. For example, upon retrieval of information on a repository from an identification image, the related information retrieval unit 23 may request the repository manager 24 to store the facsimile data that is obtained by the facsimile data receiver 21 in the repository whose information is included in the identification image.

Further, the related information retrieval unit 23 may utilize information that is retrieved through the UI unit 27, such as information on a repository or tag information, as information indicating a relationship with different facsimile data. For a case in which the information that is obtained through the UI unit 27 is utilized as information indicating a relationship with different facsimile data, the related information retrieval unit 23 can request the identification image generating unit 25 to generate an identification image. The generated identification image can be attached to facsimile data that is to be transmitted, or the generated identification image can be attached to received facsimile data.

In response to retrieving information that indicates a relationship with different facsimile data from a communication history or from an identification image of facsimile data that is stored in the server 3, the related information retrieval unit 23 may request the identification image adding unit 26 to add an identification image that includes the retrieved information to facsimile data that is to be transmitted or received facsimile data.

The repository manager 24 can create a repository for storing facsimile data that is to be transmitted or received facsimile data in a server 3, for example. The repository manager 24 can receive information on the created repository from the server 3. Further, the repository manager 24 can retrieve the information on the repository from an identification information of the facsimile data that is to be transmitted or the received facsimile data. The repository manager 24 may store the facsimile data that is to be transmitted or the received facsimile data in accordance with the retrieved information on the repository.

Upon determining that the repository that is indicated by the identification information of the facsimile data that is to be transmitted or the received facsimile data is inaccessible, the repository manager 24 may request another server 4 (not shown) to create a repository. Note that, for a case in which there is a storage area that can be accessed by the repository manager 24 in the storage area of the server 3, the repository manager 24 may request creation of a unique repository from the storage area that can be accessed. In this case, the repository manager 24 may store the facsimile data that is to be transmitted or the received facsimile data in the repository that is created in the other server 4 or in the unique repository that is created in the accessible storage area on the server 3. Further, the repository manager 24 may create, for example, a correspondence table that defines correspondence between an identification image that indicates the inaccessible repository and the repository that is created on the other server 4. Note that the correspondence table is not limited to the above-described correspondence table, and the correspondence table may indicate correspondence between the identification image that indicates the inaccessible repository and the information indicating the accessible repository that is uniquely created on the server 3.

Further, the repository manager 24 can set a name of a repository that is to be created. The repository manager 24 may determine the name of the repository in accordance with a name that is input by a user, or in accordance with predefined setting.

The identification image generating unit 25 can generate an identification image based on information that is retrieved by the related information retrieval unit 23. The identification image generating unit 25 may request the identification image adding unit 26 to add the generated identification image to the facsimile data that is to be transmitted or to the received facsimile data.

The identification image adding unit 26 can add an identification image to facsimile data that is to be transmitted and to which no identification image is attached, or to received facsimile data to which no identification is attached. The identification image adding unit 26 can add an identification image that is generated based on information indicating a relationship with different facsimile data that is retrieved from facsimile data that is stored in the main body of the MFP 2 or from an identification image of facsimile data stored in the server 3 to facsimile data that is to be transmitted, or to received facsimile data. The identification image can be added to a facsimile cover sheet, a facsimile transmission report, or a blank portion of a facsimile document, for example.

The UI unit 27 can display a selection screen, an image of communicated facsimile data, and identification image that is included in facsimile data. The UI unit 27 can receive an operation by a user.

The UI unit 27 may read an identification image that is attached to facsimile data that is brought by a user, for example, and the UI unit 27 may display facsimile data on the operations panel 210 or the like based on information that indicates a relationship with different facsimile data that is included in the identification image. Further, the UI unit 27 may receive a reply operation or the like from a user with respect to the displayed facsimile data. Further, the UI unit 27 may read information that indicates a relationship with different facsimile data from an identification image of facsimile data that is captured by an information terminal, such as a smartphone. Then, the UI unit 27 may retrieve related facsimile data from the server 3 based on the retrieved information, and the UI unit 27 may cause the smartphone or the like to display the related facsimile data.

The facsimile data transceiver 28 may transmit and receive facsimile data by using the facsimile function.

The function controller 29 can execute communication control with the server 3; print facsimile data; execute login authentication of a user; or store communication history of facsimile data.

The MFP 2 can manage a set of facsimile data while mutually associating members of the set of facsimile data that are related because the MFP 2 may have the above-described configuration. With this, a user can easily obtain members of the set of facsimile data that are related.

<Processing Operation>

Figure 5:
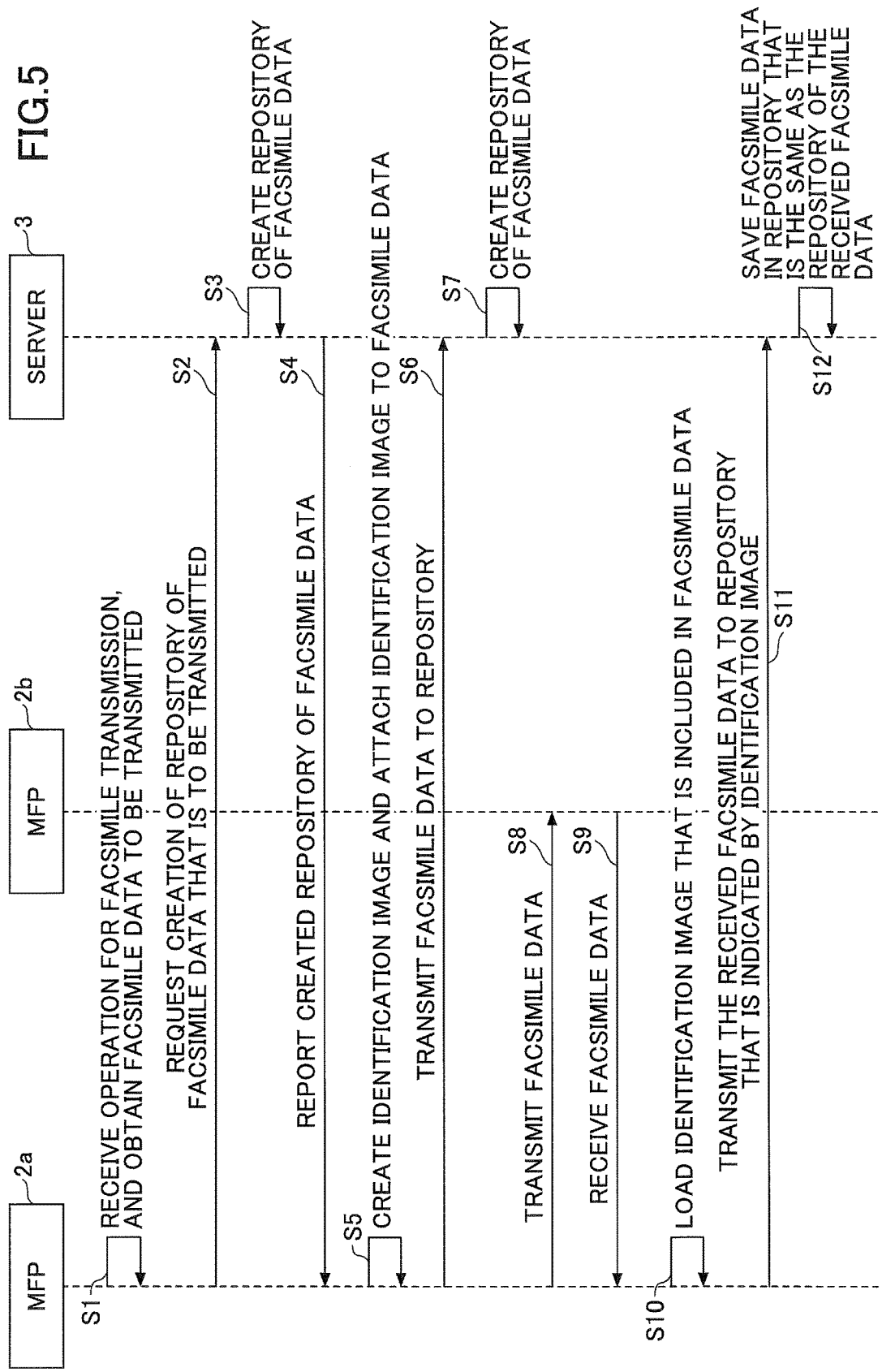
FIG. 5 is a sequence diagram showing a flow between transmission of facsimile data and reception of the facsimile data.

FIG. 5 is a sequence diagram showing a flow between transmission of facsimile data and reception of a reply to the facsimile data in the MFP 2.

At step S1, MFP 2a receives a request for transmitting facsimile data from a user. After that, MFP 2a obtains facsimile data that is to be transmitted.

At step S2, the MFP 2a requests the server 3 to create a repository (a folder) for storing the facsimile data that is to be transmitted.

At step S3, the server 3 creates a repository for storing the facsimile data in accordance with the request of the MFP 2a. The repository for storing the facsimile data that is to be transmitted may be created based on an instruction by a user. Alternatively, the server 3 may automatically determine a repository for storing the facsimile data that is to be transmitted, and the server 3 may create the repository for storing the facsimile data that is to be transmitted or received facsimile data.

At step S4, the MFP 2a can retrieve information that is related to the repository for storing the facsimile data that is to be transmitted or the received facsimile data from the server 3.

At step S5, the MFP 2a generates an identification image based on the information that is related to the repository. After that, the MFP 2a adds the identification image to the facsimile data that is to be transmitted or to the received facsimile data. For example, a page that includes the identification image may be created separately from the body of the received facsimile data. Alternatively or additionally, the MFP 2a may create tag information for the facsimile data that is to be transmitted or for the received facsimile data, and the MFP 2a may generate an identification image based on the tag information.

At step S6, the MFP 2a transmits, to the server 3 through the network, the facsimile data to which the identification image is attached.

At step S7, the server 3 stores the facsimile data that is retrieved from the MFP 2a through the network in a specified repository.

At step S8, by using the facsimile function, the MFP 2a transmits, to the MFP 2b via facsimile transmission, the facsimile data to which the identification image is attached. After that, in response to receiving from a user, a document for reply with respect to the facsimile data that is received by the MFP 2b from the MFP 2a by the facsimile transmission, the MFP 2b creates the facsimile data that is to be the reply, and the MFP 2b transmits the created facsimile data via facsimile transmission.

At step S9, the MFP 2a receives the reply to the transmitted facsimile data from the MFP 2b via the facsimile transmission.

At step S10, the MFP 2a determines whether the identification image is included in the received facsimile data. In response to determining that the identification image is included in the received facsimile data, the MFP 2a retrieves information that is related to a repository from the identification image.

At step S11, the MFP 2a transmits, based on the retrieved information that is related to the repository or the tag information, the replied facsimile data to the server 3 through the network.

At step S12, the server 3 stores the replied facsimile data in the repository that is the same repository in which the facsimile data is stored at step S7.

Figure 6:
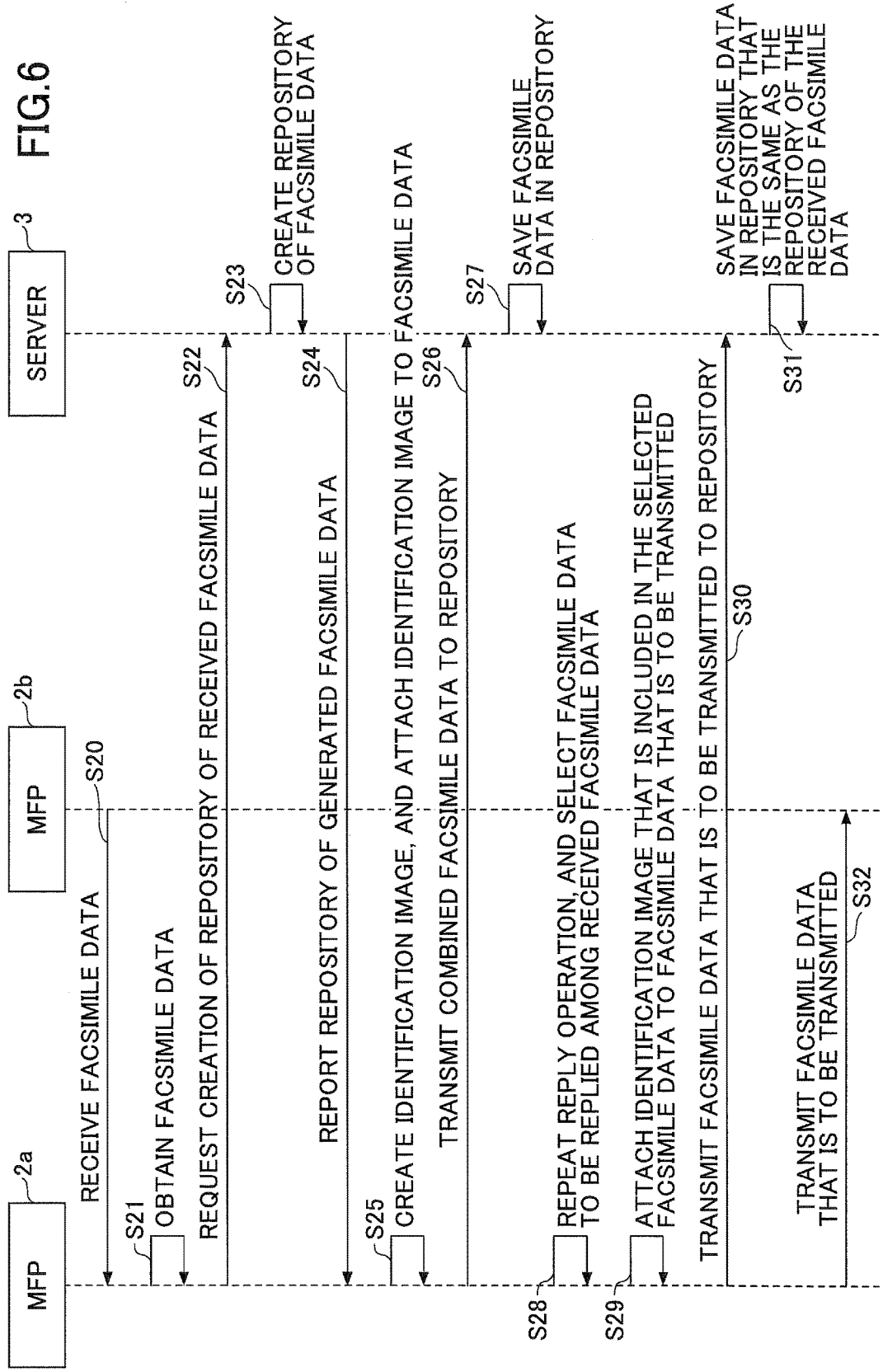
FIG. 6 is a sequence diagram showing a flow between reception of the facsimile data by the MFP and transmission of a reply by the MFP.

FIG. 6 is a sequence diagram showing a flow between the reception of the facsimile data by the MFP 2 and the transmission of a reply from the MPF 2.

At step S20, the MFP 2a receives facsimile data from the MFP 2b by using facsimile communication.

At step S21, the facsimile data receiver 21 of the MFP 2a obtains the facsimile data that is received from the MFP 2b.

At step S22, the MFP 2a determines whether an identification image is included in the facsimile data that is received from the MFP 2b by using the facsimile communication. For example, in response to determining that no identification image is included, and that there is no repository for storing the facsimile data, the MFP 2a requests the server 3 to create a repository for storing the facsimile data. The process is described below for the case in which no identification image is included in the facsimile data that is received from the MFP 2b.

At step S23, the server 3 creates a repository for storing the received facsimile data in accordance with the request from the MFP 2a. The repository for storing the received facsimile data is created based on an instruction by a user. Alternatively, the server 3 may automatically determines the repository for storing the received facsimile data.

At step S24, the MPF 2a receives the information that is related to the created repository from the server 3 through the network.

At step S25, the MFP 2a generates an identification image based on the information that is related to the repository. Alternatively, the MFP 2a may generate tag information for the received facsimile data, and the MFP 2a may generate an identification image based on the tag information.

At step S26, the MFP 2a transmits the received facsimile data to the server 3 through the network.

At step S27, the server 3 stores the facsimile data that is received from the MFP 2a in a specified repository.

At step S28, the MFP 2a receives an instruction to reply from a user. After that, the MFP 2a obtains facsimile data that is to be transmitted as a reply to the received facsimile data.

At step S29, the MFP 2a extracts (cuts out) the identification image that is included in the facsimile data that is received by using the facsimile communication, and the MFP 2a, and the MFP 2a attaches the identification image to the facsimile data that is to be the reply. The MFP 2a may attach the identification image to the body of the facsimile data that is to be transmitted as the reply to the received facsimile data, or to a facsimile transmission report, for example. The identification image may be generated based on the information that is related to the repository or the tag information.

At step S30, the MFP 2a transmits the facsimile data to which the identification image is attached to the repository that is indicated by the identification image through the network.

At step S31, the server 3 stores the facsimile data that is to be transmitted in a specified repository.

At step S32, the MFP 2a transmits the facsimile data to the MFP 2b by using the facsimile function.

Figure 7:
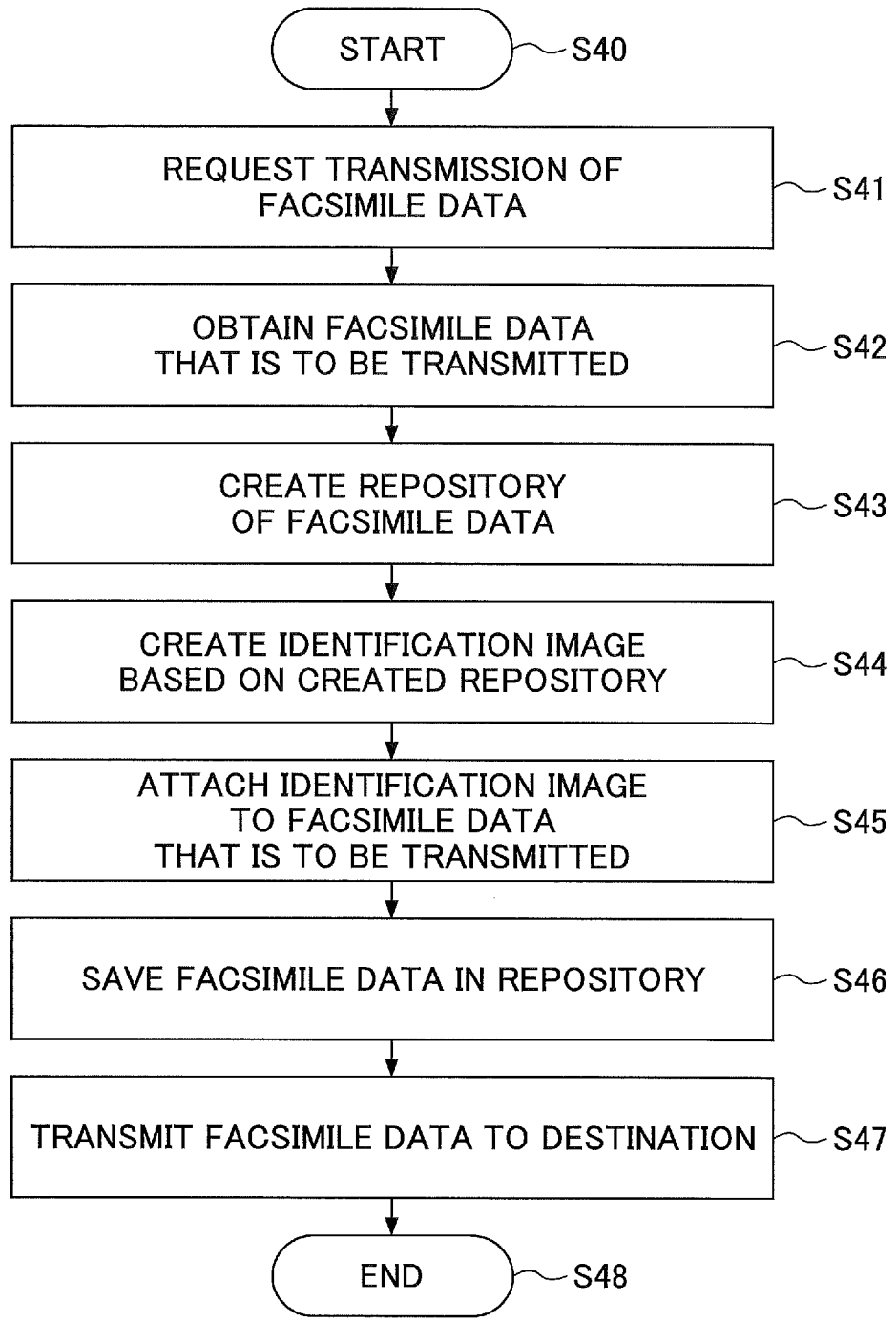
FIG. 7 is a flowchart showing an example of a procedure of a transmission process that is executed by the MFP during transmission.

FIG. 7 is a flowchart showing an example of a procedure of a transmission process that is executed by the MFP 2 during transmission.

At step S40, the process is started.

At step S41, the UI unit 27 receives a request for facsimile transmission from a user.

At step S42, the facsimile data receiver 21 obtains the facsimile data that is to be transmitted by using facsimile communication from the user.

At step S43, the repository manager 24 creates a repository for storing the facsimile data in the server 3 based on an instruction by a user, for example. After creation of the repository in the server 3, the MFP 2 retrieves the information that is related to the repository from the server 3. For a case in which the identification image is included in the facsimile data that is to be transmitted, it is not necessary to newly generate the identification image. That is the same for the following steps.

At step S44, the identification image generating unit 25 generates an identification image based on the information of the repository that is received from the server 3 through the network. Alternatively, the MFP 2a may generate tag information for the facsimile data that is to be transmitted, and the MFP 2a may generate an identification image based on the tag information.

At step S45, the identification image adding unit 26 attaches the generated identification image to the facsimile data that is to be transmitted by using facsimile communication.

At step S46, the repository manager 24 saves the facsimile data that is to be transmitted in the repository.

At step S47, the facsimile data transceiver 28 transmits the facsimile data to which the identification image is attached to the MFP 2 that is the destination by using facsimile communication, and thereby the process is terminated.

Figure 8:
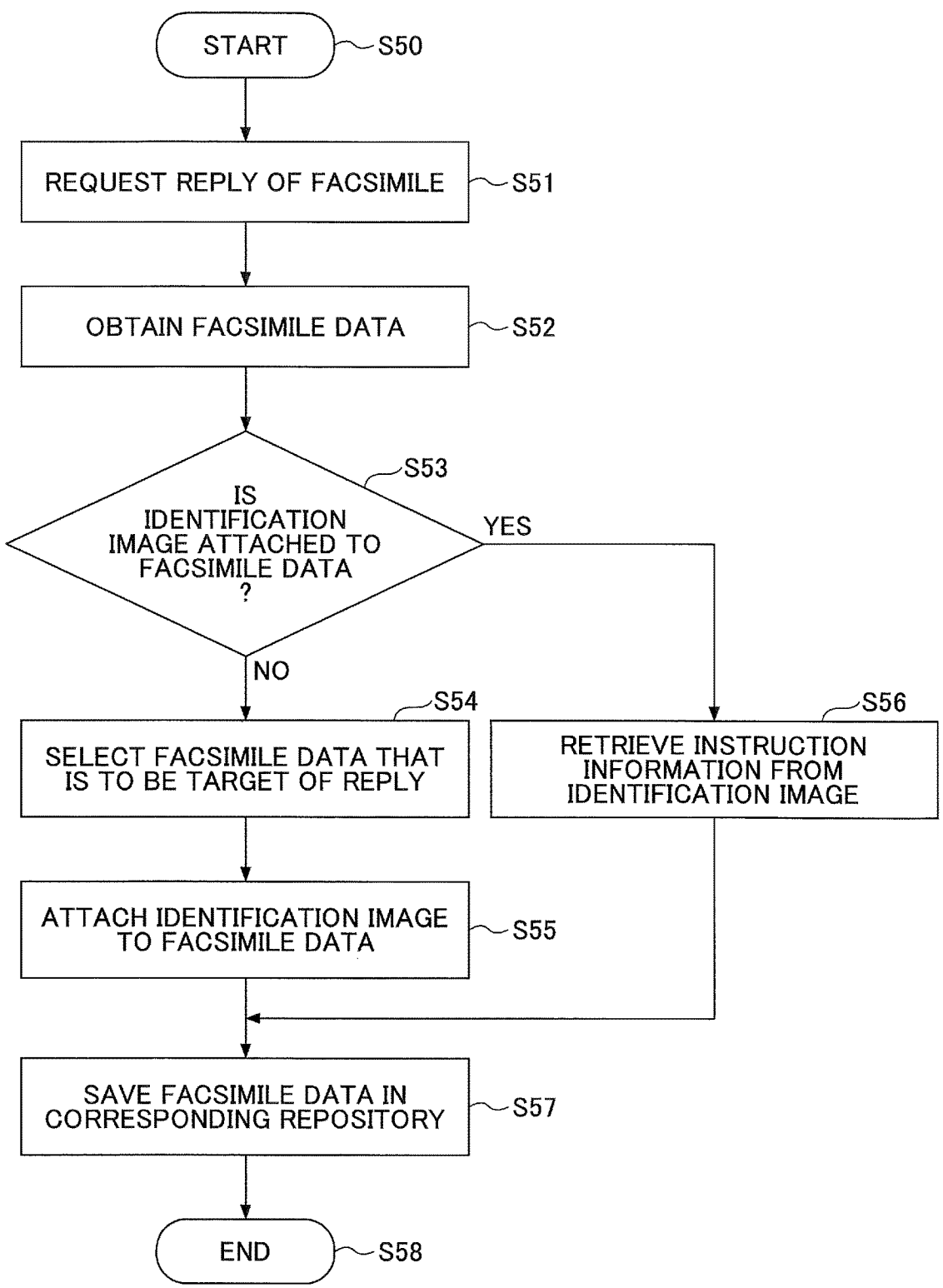
FIG. 8 is a flowchart showing an example of a procedure of a reply process for the facsimile data that is received by the MFP.

FIG. 8 is a flowchart showing an example of a replay process with respect to the facsimile data that is received by the MFP 2.

The process is started at step S50.

At step S51, the UI unit 27 obtains, from a user, a request for replying to the facsimile data.

At step S52, the facsimile data receiver 21 obtains the facsimile data that is to be transmitted as a reply to the received facsimile data.

At step S53, the determining unit 22 determines whether an identification image is included in the received facsimile data. In response to determining that the determination result is "YES," namely, in response to determining that the received facsimile data includes the identification image, the process proceeds to step S56. In response to determining that the determination result is "NO," namely, in response to determining that the received facsimile data does not include the identification image, the process proceeds to step S54.

At step S54, the UI unit 27 obtains, from the user, a selection of the facsimile data that identifies the facsimile data to which the reply is to be made. The facsimile data that identifies the facsimile data to which the replay is to be made is selected from the transmission and reception history that is stored in the main body of the MFP 2, or from the set of the facsimile data that is stored in the server 3.

Figure 9:
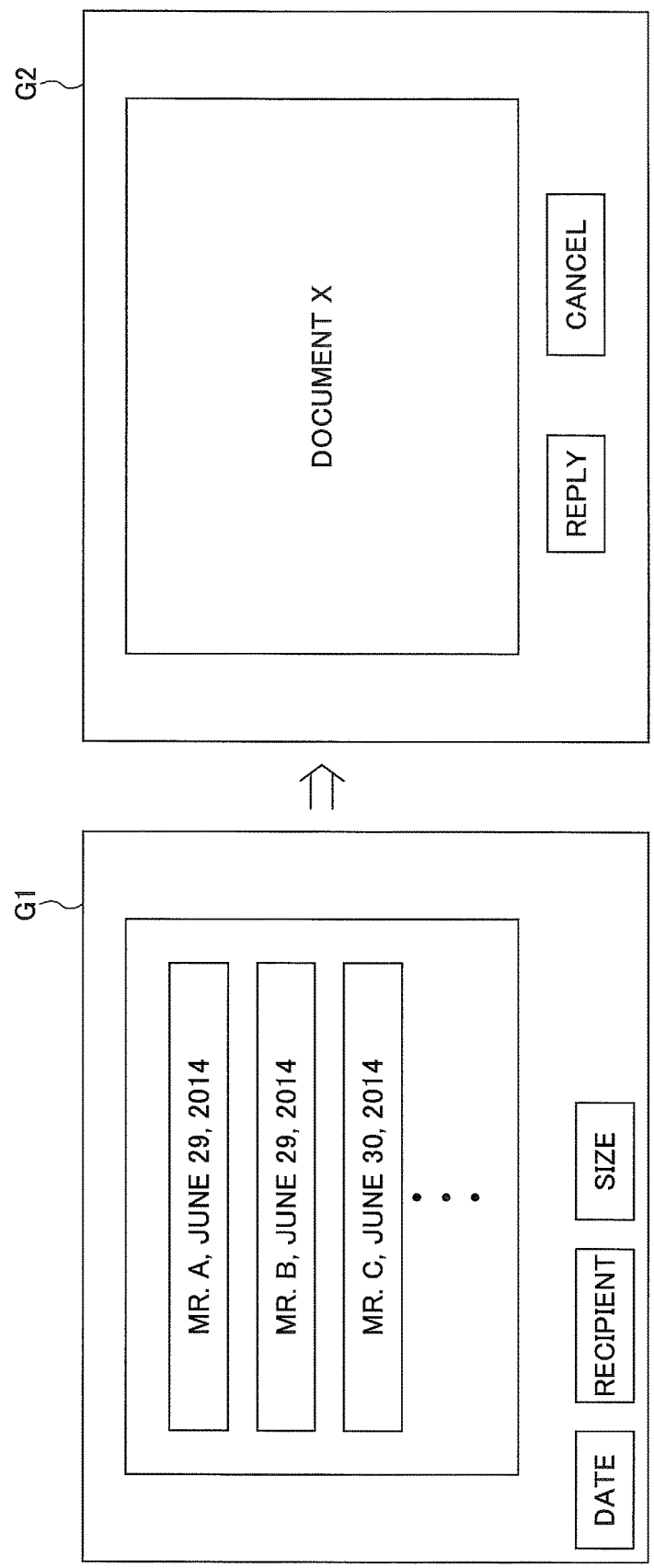
FIG. 9 is a diagram showing a schematic view of an example of a list screen of a transmission and reception history of facsimile transmission and reception.

FIG. 9 is an image diagram showing an example of a list screen of transmission and reception history of facsimile data. As shown in the display screen G1, a destination of communication and date are displayed. Further, in the list of the transmission and the reception of facsimile data, an order of displaying can be changed depending on the date and the destination of the communication.

In the display screen G1, in response to selection of any history, a screen of the display screen G2 is displayed. In the display screen G2, the communicated facsimile data is displayed. Note that, upon selecting the reply, a reply process is executed for the selected facsimile data.

Referring to FIG. 8, at step S55, the related information retrieval unit 23 retrieves the information that is related to the repository or the tag information from the identification image that is included in the facsimile data that is selected for identifying the facsimile data for which a reply is to be made. After that, the identification image adding unit 26 generates the identification image based on the information that is related to the repository or the tag information, and the identification image adding unit 26 adds the generated identification image to the facsimile data.

At step S56, the related information retrieval unit 23 retrieves the information related to the repository or the tag information from the attached identification image.

At step S57, the repository manager 24 stores the facsimile data in accordance with the retrieved information. After that, the process is terminated.

Figure 10:
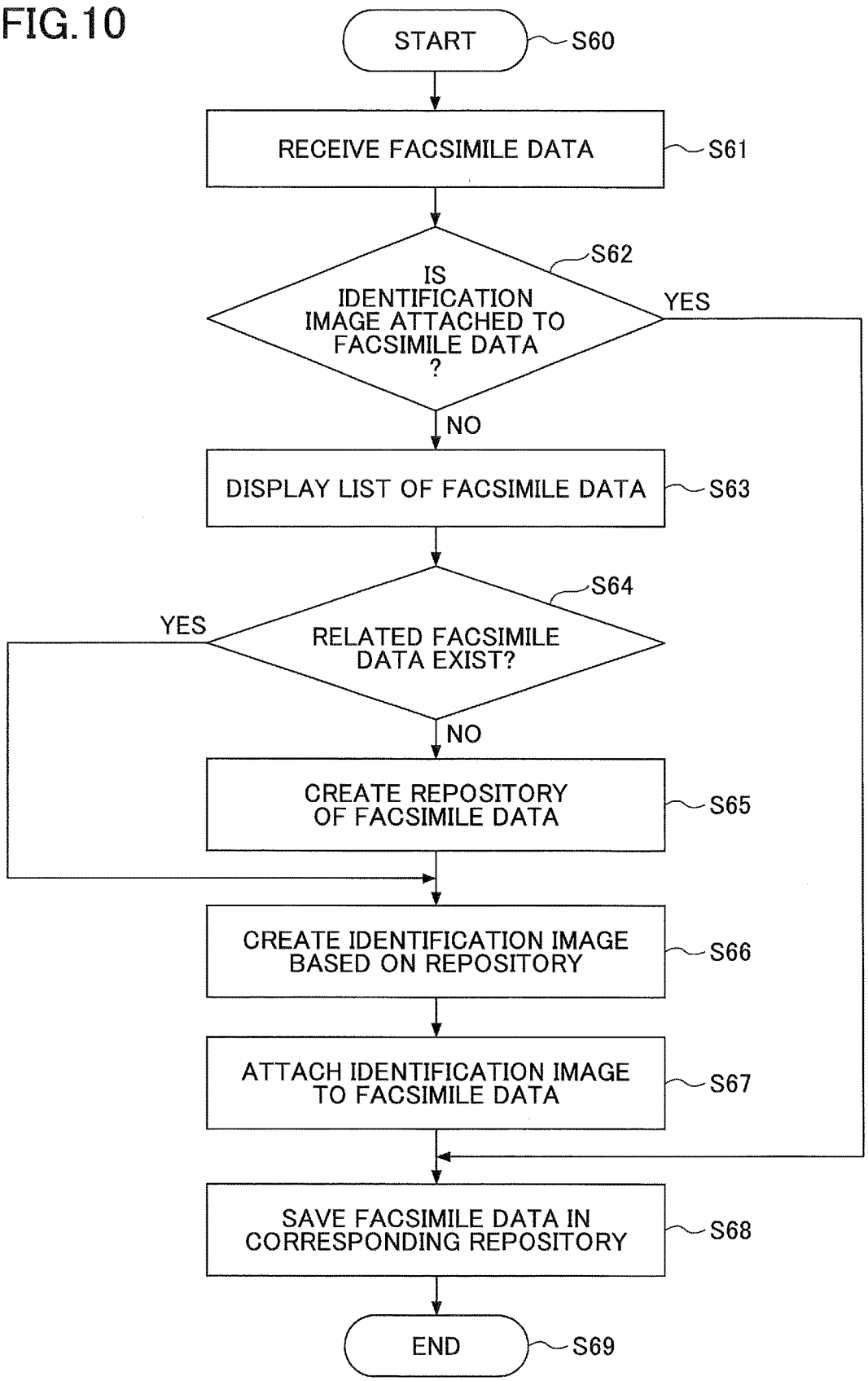
FIG. 10 is a flowchart showing an example of a receiving process that is executed during reception of facsimile by the MFP.

FIG. 10 is a flowchart showing an example of a receiving process that is executed for receiving facsimile data.

At step S60, the process is started.

At step S61, the facsimile data transceiver 28 receives facsimile data by using facsimile communication.

At step S62, the determining unit 22 determines whether the received facsimile data includes an identification image. In response to detecting that the determination result is "YES," namely, in response to detecting that the received facsimile data includes the identification image, the process proceeds to step S68. In response to detecting that the determination result is "NO," namely, in response to detecting that the received facsimile data does not include the identification image, the process proceeds to step S63.

At step S63, the UI unit 27 displays a list of a transmission and reception history, for example.

At step S64, the determining unit 22 determines whether a user selects facsimile data that is related to the received facsimile data from the list of the transmission and reception history. In response to detecting that the determination result is "YES," namely, in response to detecting that the user selects some facsimile data, the process proceeds to step S66. In response to detecting that the determination result is "NO," namely, in response to detecting that the user doe not select any facsimile data, the process proceeds to step S65.

At step S65, the repository manager 24 creates a repository for storing facsimile data based on a user's instruction, for example. Note that, when a repository already exists, another repository may not be created.

At step S66, the identification image generating unit 25 creates an identification image based on information that indicates the repository. Alternatively, the MFP 2a may create tag information for the facsimile data that is to be transmitted, and the MFP 2a may generate an identification image based on the tag information.

At step S67, the identification image adding unit 26 attaches the generated identification image to the received facsimile data.

At step S68, the repository manager 24 stores the received facsimile data in a specified repository. After that, the process is terminated.

Figure 11:
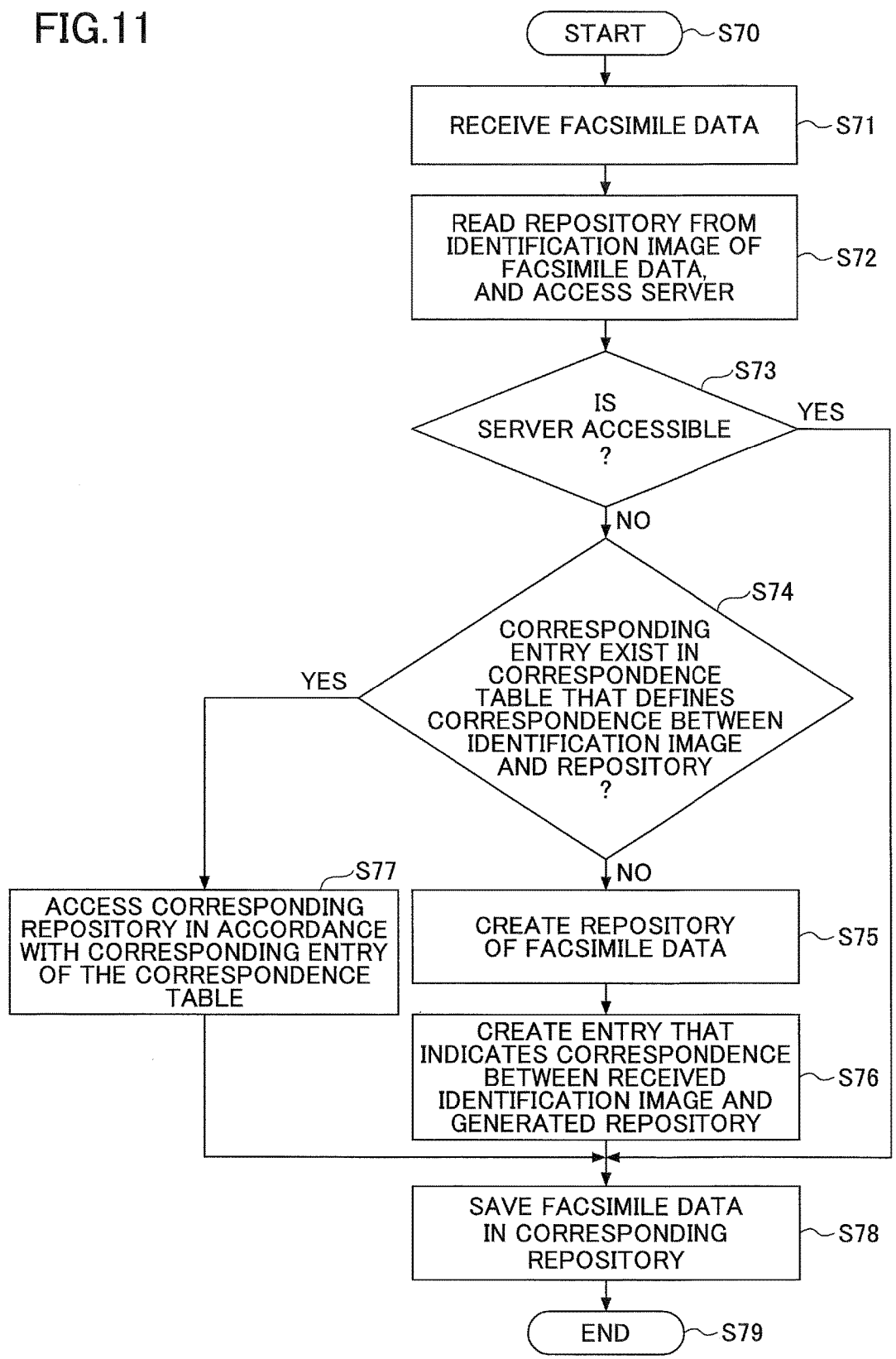
FIG. 11 is a flowchart showing an example of a storing process for storing facsimile data for a case in which a server cannot access a repository that is indicated by an identification image.

FIG. 11 is a flowchart showing an example of a process of storing facsimile data in a case in which the server 3 is not able to access a repository that is indicated by an identification image.

At step S70, the process is started.

At step S71, the facsimile data transceiver 28 receives facsimile data by using facsimile transmission.

At step S72, the repository manager 24 accesses the server 3 that includes a repository that is indicated by an identification image of the facsimile data that is received by using the facsimile transmission.

At step S73, the repository manager 24 determines whether the repository manager 24 can access the server 3 that includes the repository that is indicated by the identification image of the facsimile data. In response to detecting that the determination result is "YES," namely, in response to detecting that the repository manger 24 can access the server 3, the process proceeds to step S78. In response to detecting that the determination result is "NO," namely, in response to detecting that the repository manager 24 is not able to access the server 3, the process proceeds to step S74. As an example of a case in which the repository manager 24 is not able to access the server 3, a case is considered in which the server 3 is a server that is administered by another company.

At step S74, the repository manager 24 determines whether a relevant entry exists in a correspondence table that defines a correspondence between a repository that is created on the server 3 that is inaccessible and a repository that is created on a server 4 (not shown) that is administered by a company and that is accessible, for example. In response to detecting that the determination result is "YES," namely, in response to detecting that the relevant entry exists in the correspondence table, the process proceeds to step S77. In response to detecting that the determination result is "NO," namely, in response to detecting that no relevant entry exists in the correspondence table, the process proceeds to step S75.

At step S75, the repository manager 24 newly creates, on the other server 4, a repository for storing the facsimile data that is received by using the facsimile communication.

At step S76, the repository manager 24 creates an entry that indicates a correspondence between the identification image that indicates the repository that is created on the server 3 that is inaccessible and the newly created repository.

At step S77, the repository manager 24 accesses the relevant repository in accordance with the relevant entry in the correspondence table.

At S78, the repository manager 24 stores, in the repository, the facsimile data that is received by using the facsimile communication. After that, the process is terminated.

Figure 12:
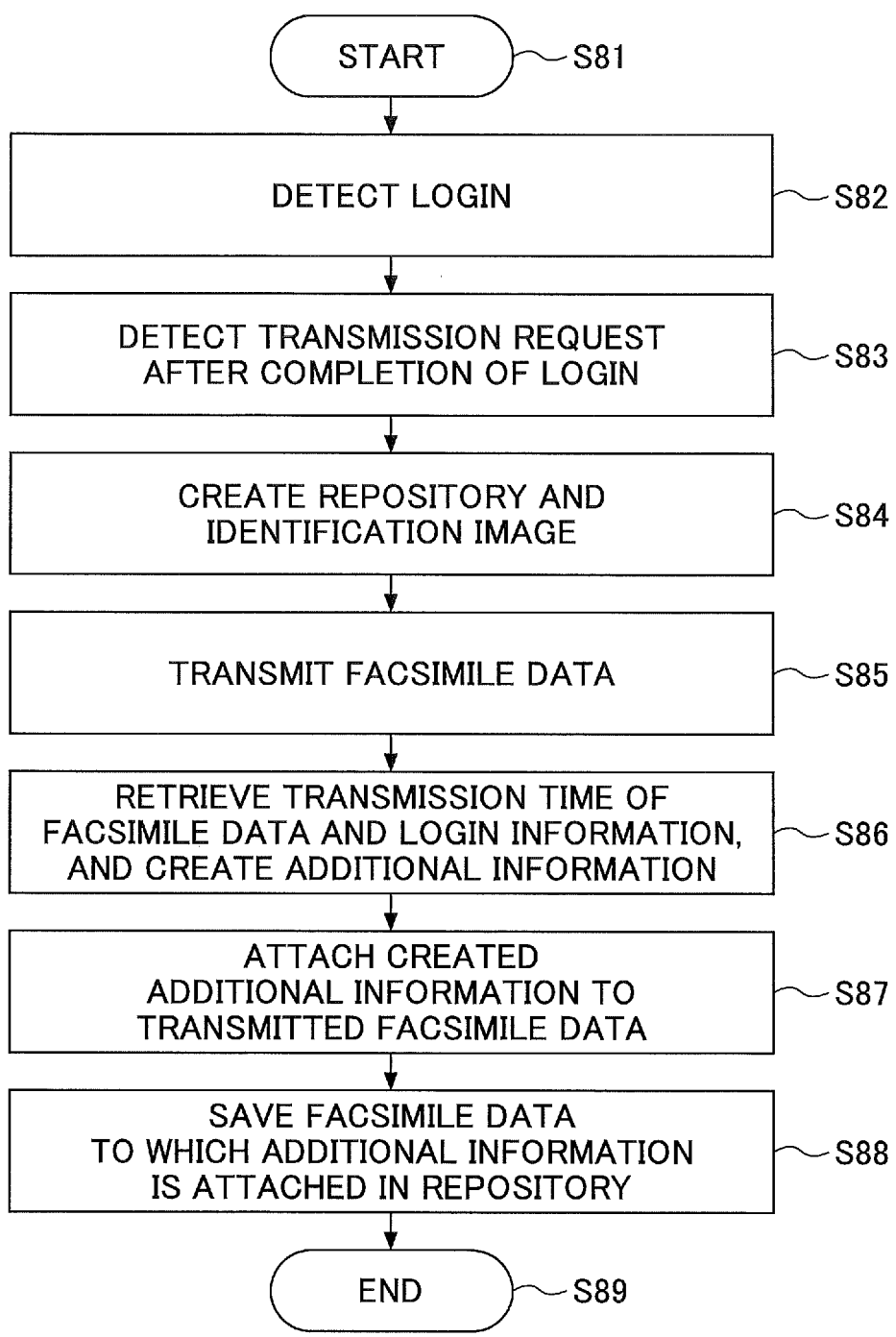
FIG. 12 is a flowchart showing an example of a process of storing facsimile data to which login information is attached.

FIG. 12 is a flowchart showing an example of a process of storing facsimile data to which login information is attached.

At step S81, the process is started.

At step S82, the UI unit 27 detects a login operation by a user.

At step S83, the UI unit 27 receives an operation for transmitting facsimile data from the user who completes the log in.

At step S84, the repository manager 24 creates, on the server 3, a repository for storing facsimile data that is to be transmitted by facsimile transmission. The identification image generating unit 25 generates an identification image based on information on the generated repository. Note that, when a repository already exists, it is not necessary image adding unit 26 adds the generated identification image to the facsimile data that is to be transmitted by the facsimile transmission.

At step S85, the facsimile data transceiver 28 transmits the facsimile data that is to be transmitted to a destination by using facsimile transmission. At this time, the facsimile data transceiver 28 records transmission time of transmitting the facsimile data.

At step S86, the function controller 29 generates information that is to be attached to the transmitted facsimile data based on the transmission time of transmitting the facsimile data and the login information.

At step S87, the function controller 29 attaches the generated information to the facsimile data that is transmitted by using facsimile transmission.

At step S88, the repository manager 24 stores the transmitted facsimile data in a repository. After that, the process is terminated.

Figure 13:
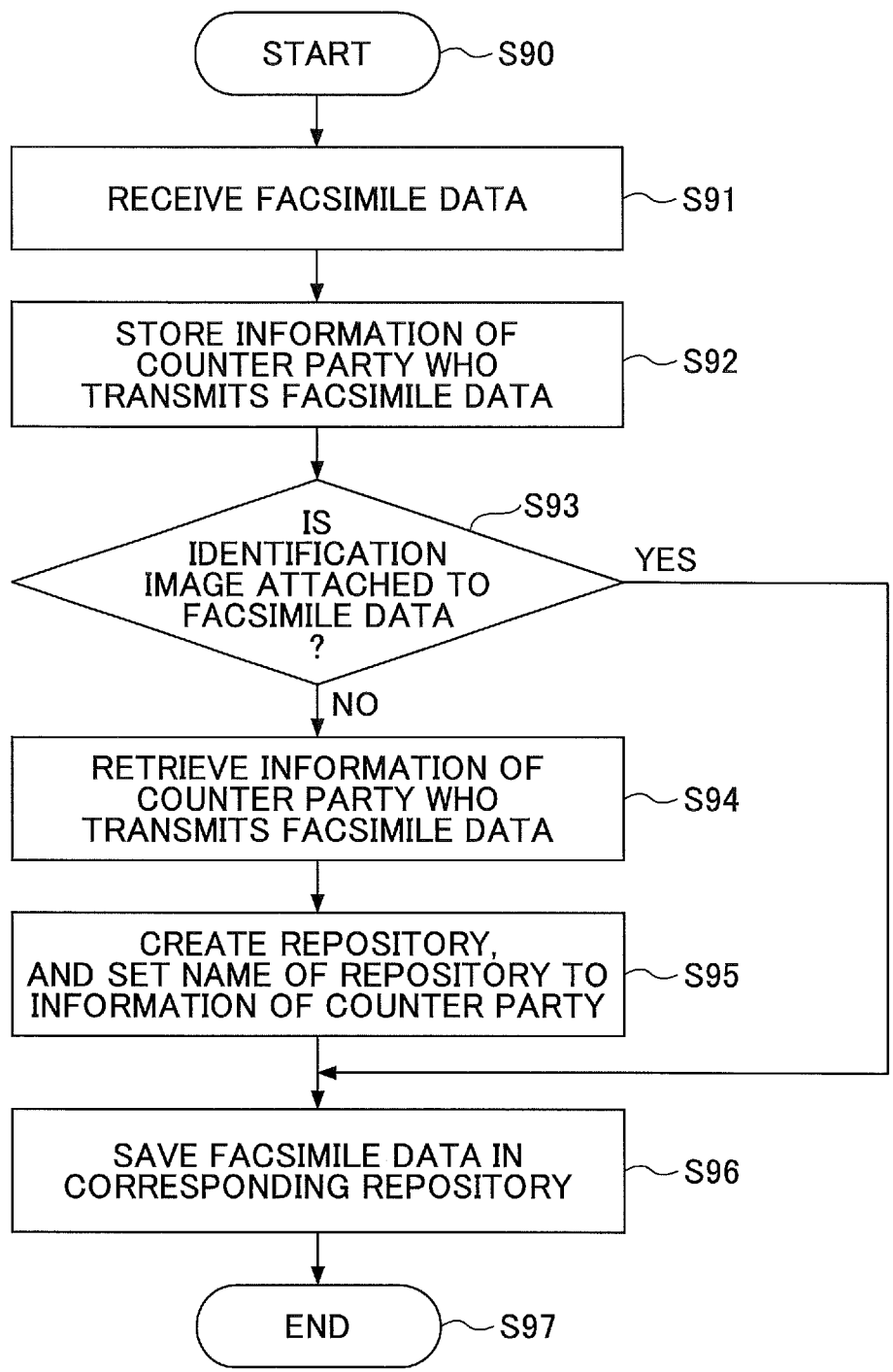
FIG. 13 is a flowchart showing an example of a process of setting a name of a repository of facsimile data.

FIG. 13 is a flowchart showing an example of a process of setting a name of a repository for storing facsimile data.

At step S90, the process is started.

At step S91, the facsimile data transceiver 28 receives facsimile data by using facsimile communication.

At step S92, the function controller 29 stores information on a destination of facsimile communication.

At step S93, the determining unit 22 determines whether an identification image is attached to the received facsimile data. In response to detecting that the determination result is "YES," namely, in response to detecting that the identification image is attached to the received facsimile data, the process proceeds to step S96. In response to detecting that the determination result is "NO," namely, in response to detecting that no identification image is attached to the facsimile data, the process proceeds to step S94.

At step S94, the function controller 29 retrieves the information on the destination that is stored.

At step S95, the repository manager 24 determines the name of the repository based on the retrieved information on the destination, and the repository manager 24 creates the repository for storing the received facsimile data on the server 3.

At step S96, the repository manager 24 stores the received facsimile data in the corresponding repository. After that, the process is terminated.

Figure 14:
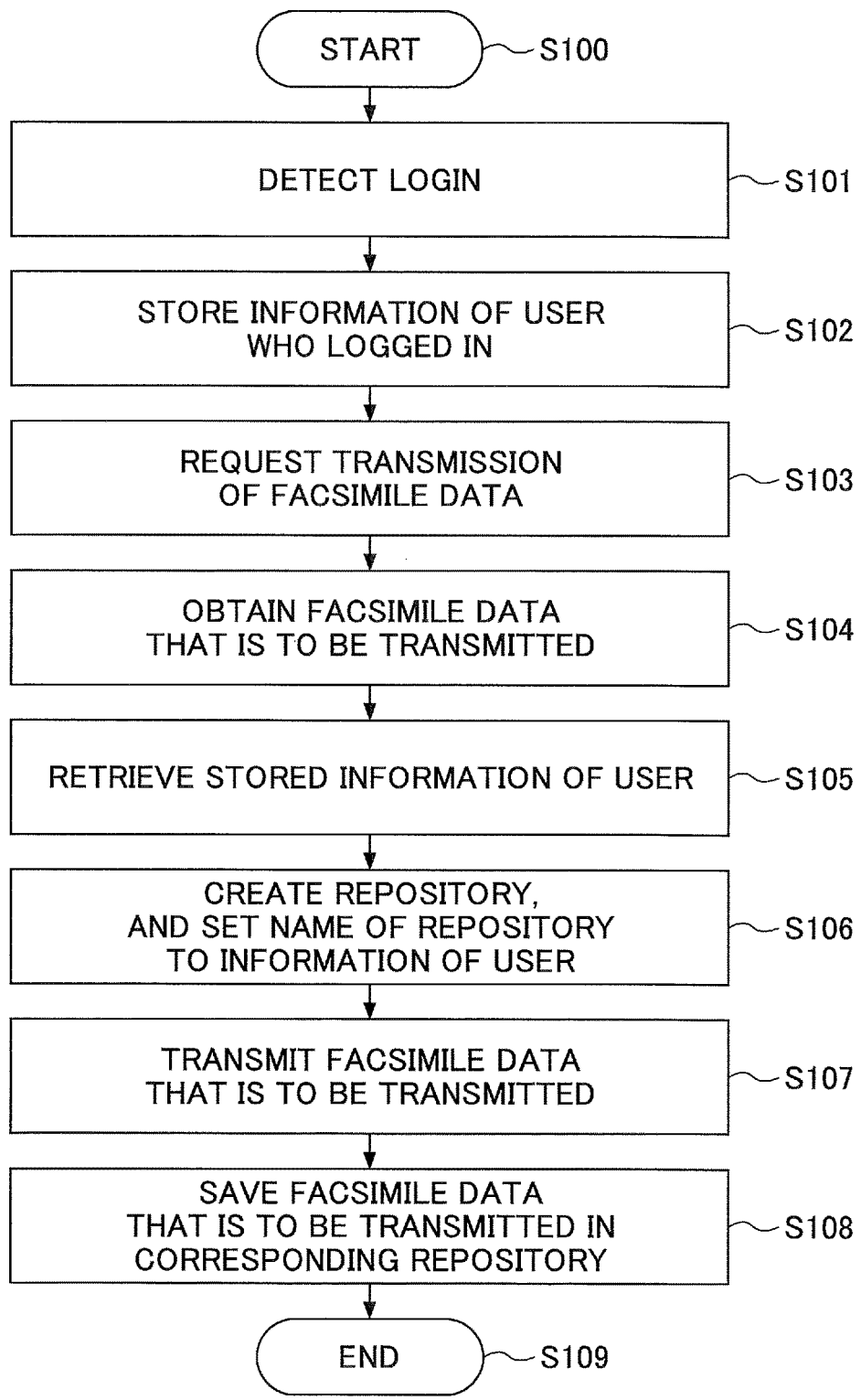
FIG. 14 is a flowchart showing an example of a process of setting a name of a repository of facsimile data based on information of a user who transmits the facsimile data.

FIG. 14 is a flowchart showing an example of a process of setting a name of a repository for storing facsimile data based on information on a user who transmits the facsimile data.

At step S100, the process is started.

At step S101, the UI unit 27 receives a login operation from a user.

At step S102, the function controller 29 stores user information of the logged-in user.

At step S103, the UI unit 27 receives a request for transmitting facsimile data from the user.

At step S104, the facsimile data receiver 21 reads the facsimile data that is to be transmitted by using facsimile transmission.

At step S105, the function controller 29 retrieves the user information of the user who attempts to transmit, by using facsimile transmission, the facsimile data that is to be transmitted.

At step S106, the repository manager 24 determines a name of a repository based on the login information that is retrieved at step S105, and the repository manager 24 creates, on the server 3, the repository for storing the facsimile data that is to be transmitted.

At step S107, the repository manager 24 stores the facsimile data that is to be transmitted by using the facsimile transmission in the repository.

At step S108, the facsimile data transceiver 28 transmits, to a destination, the facsimile data that is to be transmitted by using the facsimile transmission. After that, the process is terminated.

Figure 15:
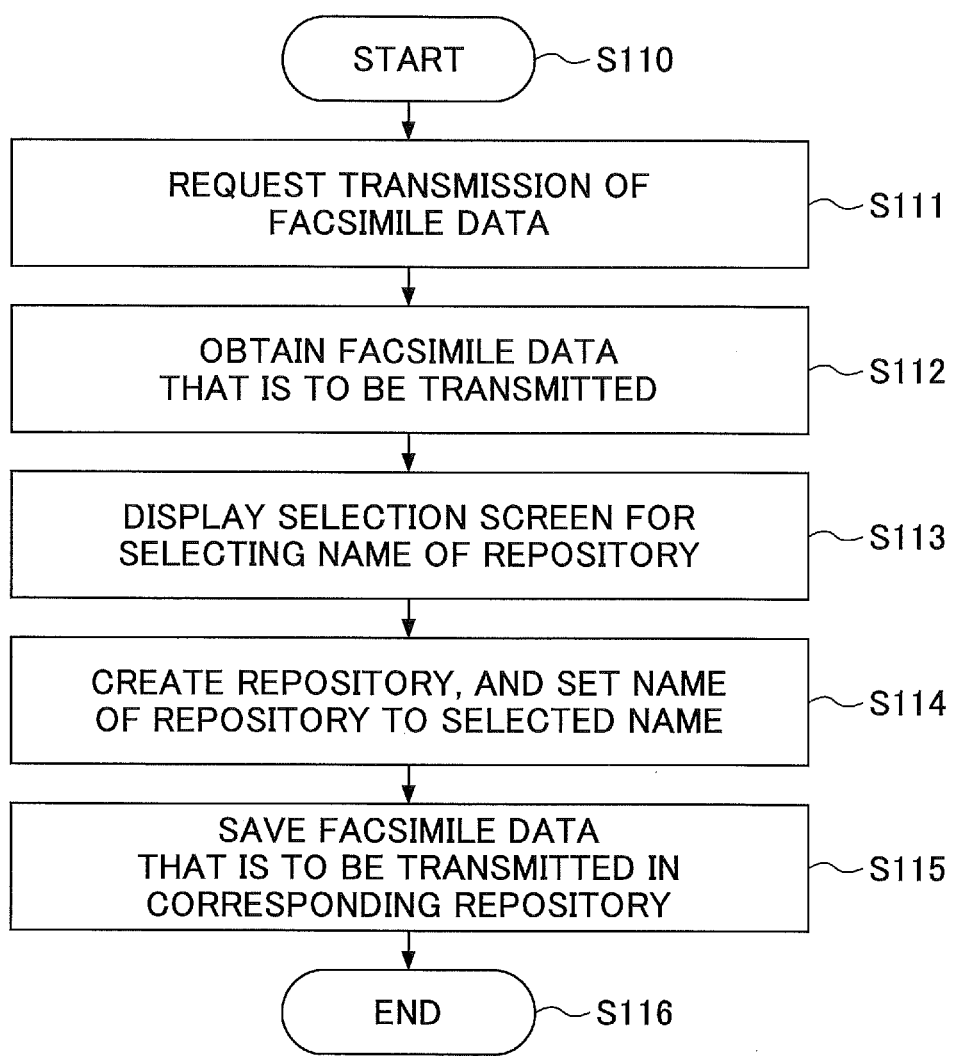
FIG. 15 is a flowchart showing an example of a process of determining a name of a repository of facsimile data in accordance with a user's instruction.

FIG. 15 is a flowchart showing an example of a process of determining a name of a repository for storing facsimile data, in accordance with a user's instruction.

At step S110, the process is started.

At step S111, the UI unit 27 receives an instruction for transmitting facsimile data from a user, or the UI unit 27 receives facsimile data.

At step S112, the facsimile data receiver 21 obtains the facsimile data that is to be transmitted by using facsimile transmission or the facsimile data that is received by using the facsimile communication.

At step S113, the UI unit 27 list-displays candidates for a way of giving a name of a repository. A user selects the way of giving the name of the repository from the list of the candidates for the way of giving the name of the repository that is list-displayed.

FIG. 16 is a conceptual diagram showing an example of a screen that is to be displayed during setting of the name of the repository. In the display screen G3, the MFP 2 lets the user select whether to select the name of the repository. In response to detecting that the user makes an operation to disallow the selection of the name of the repository, the name of the repository is set in accordance with a predetermined way of giving a name. Alternatively, in response to receiving an operation for selecting the name of the repository, the display screen G4 is displayed. In the display screen G4, a list of ways of giving a name of a repository is displayed. In response to detecting that the user selects one of the ways of giving the name from the list of the ways of giving the name of the repository, the name of the repository is set in accordance with the selected ways of giving the name.

Referring to FIG. 15, at step S114, the repository manager 24 determines the name of the repository in accordance with the way that is selected by the user by the user's instruction, for example, and the repository manager 24 creates the repository on the server 3.

At step S115, the repository manager 24 stores the facsimile data in the corresponding repository. After that, the process is terminated.

Modified Example

In this modified example, a configuration is explained such that, for replying to specific facsimile data, the specific facsimile data is read from a medium such as a paper sheet. In the modified example, the matter that is different from that of the above-described embodiment is explained. The same reference numerals are attached to the same components, and the explanation of these components is omitted.

<Functional Configuration>

The facsimile data receiver 21 obtains facsimile data that identifies facsimile data to which a reply is to be made through a medium such as a paper sheet on which the received facsimile data is printed.

For a case in which a reply is to be made to the received facsimile data, the determining unit 22 confirms whether an identification image is included in the facsimile data that is received via facsimile communication.

The related information retrieval unit 23 retrieves information that indicates a relationship with different facsimile data from the identification image that is included in the facsimile data that is received by the facsimile communication.

The identification image adding unit 26 adds, to facsimile data that is to be transmitted as a reply to the received facsimile data, an identification image that is generated based on the information that indicates the relationship with the different facsimile data.

The repository manager 24 retrieves, in accordance with the information that is retrieved by the related information retrieval unit 23, facsimile data that is most recently stored in the corresponding repository, among the set of facsimile data that is stored in the corresponding repository. The UI unit 27 displays the retrieved facsimile data, and the UI unit 27 prompts a user to confirm whether the repository is the correct repository that stores the facsimile data that is to be transmitted. For example, the user can make a judgment that the repository is the correct repository that stores the facsimile data that is to be transmitted, if the printed received facsimile data matches the facsimile data that is displayed on the UI unit 27.

<Processing Operation>

FIG. 17 is a sequence diagram showing a flow between reception of facsimile data and a reply to the facsimile data in the modified example.

At step S120, the MFP 2a receives facsimile data via facsimile communication.

At step S121, the MFP 2a determines whether an identification image is included in the received facsimile data. In response to detecting that the identification image is not included in the received facsimile data, the MFP 2a requests the server 3 to create a repository for storing the received facsimile data. Note that, when a repository already exists, it is not necessary to create another repository.

At step S122, the server 3 creates a repository in accordance with the request that is received from the MFP 2a.

At step S123, the MFP 2a receives information on a repository that is generated by the server 3 in accordance with a user's instruction, for example.

At step S124, the MFP 2a generates an identification image based on the received information on the repository. The MFP 2a adds the generated identification image to the facsimile data.

At step S125, the MFP 2a transmits the received facsimile data to the repository.

At step S126, the server 3 stores, in the specified repository, the facsimile data that is received from the MFP 2a by using facsimile communication.

At step S127, the MFP 2a prints the facsimile data to which the identification image is attached.

At step S128, the MFP 2a receives a request for a reply from a user. The MFP 2a obtains facsimile data that is to be transmitted as a reply to the facsimile data. After that, the MFP 2a reads an identification image that is included in the facsimile data. The identification image identifies to which facsimile data a reply is to be made.

At step S129, the MFP 2a retrieves, from the read identification image, information on a repository that stores the facsimile data. The information on the repository identifies to which facsimile data the reply is to be made. The MFP 2a requests the server 3 to transmit, to the MFP 2a, the facsimile data that is most recently stored in the repository, among the set of facsimile data that is stored in the repository.

At step S130, the MFP 2a retrieves, from the server 3, the facsimile data that is most recently stored in the corresponding repository.

At step S131, the MFP 2a displays the facsimile data that is received from the server 3, and the MFP 2a prompts the user to confirm whether the repository is the correct repository that stores the facsimile data that is to be replied to.

At step S132, the MFP 2a generates an identification image prior to transmission, and the MFP 2a adds the identification image to the facsimile data that is to be transmitted as the reply.

At step S133, after the confirmation by the user is completed, the MFP 2a transmits, to the server 3 through the network, the facsimile data that is to be transmitted.

At step S134, the server 3 stores, in the specified repository, the facsimile data that is to be transmitted as the reply to specific facsimile data.

At step S135, the MFP 2a transmits, to a destination, the facsimile data that is to be transmitted as the reply to the specific facsimile data.

Note that all or a part of the above-described embodiments can be implemented by a program. This program may be stored in a portable recording medium. The portable recording medium can be defined to be a non-transitory storage medium. Examples of the portable recording medium include a magnetic recording medium, an optical disk, a magneto-optical recording medium, a non-volatile memory, and so forth. When the program that is stored in the portable recording medium is read out, and when the program is executed by a processor, all or a part of the embodiments of the present invention can be implemented.

The non-transitory storage medium storing a communication program, a facsimile device, and a communication system are explained above by the embodiments. However, the present invention is not limited to the embodiments, and various modifications and improvements may be made within the scope of the present invention. Specific examples of numerical values are used in order to facilitate understanding of the invention. However, these numerical values are simply illustrative, and any other appropriate values may be used, except as indicated otherwise. The separations of the items in the above-described explanation are not essential to the present invention. Depending on necessity, subject matter described in two or more items may be combined and used, and subject matter described in an item may be applied to subject matter described in another item (provided that they do not contradict). A boundary of a functional unit or a processing unit in a functional block does not necessarily correspond to a boundary of a physical component. An operation by a plurality of functional units may be physically executed by a single component. Alternatively, an operation by a single functional unit may be physically executed by a plurality of components. For the convenience of explanation, the devices according to the embodiment of the present invention are explained by using the functional block diagrams. However, these devices may be implemented in hardware, software, or combinations thereof. The software that operates in accordance with the present invention may be prepared in any appropriate storage medium, such as a random access memory (RAM), a flash memory, a read-only memory (ROM), an EPROM, an EEPROM, a register, a hard disk drive (HDD), a removable disk, a CD-ROM, a database, a server, and the like.

The present invention can be implemented in any convenient form, for example using dedicated hardware, or a mixture of dedicated hardware and software. The present invention may be implemented as computer software implemented by one or more network processing apparatuses. The network can comprise any conventional terrestrial or wireless communications network, such as the Internet. The processing apparatuses can compromise any suitable programmed apparatuses such as a general-purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, a hard disk, a CD ROM, a magnetic tape device or a solid state memory device. The hardware platform includes any desired hardware resources including, for example, a central processing unit (CPU), a random access memory (RAM), and a hard disk drive (HDD). The CPU may include processors of any desired kinds and numbers. The RAM may include any desired volatile or nonvolatile memories. The HDD may include any desired nonvolatile memories capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

The present application is based on and claims the benefit of priority of Japanese Patent Application No. 2014-164765, filed on Aug. 13, 2014, the entire contents of which are hereby incorporated by reference.

What is claimed is:

1. A non-transitory storage medium comprising a computer readable program that, when executed by a processor, configures the processor to,
   receive facsimile data;
   determine if an identification image is included in the received facsimile data;
   display a list including at least one item of prior facsimile data stored in a storage device, if the processor determines that the identification image is not included in the facsimile data;
   receive an instruction to associate a selected one of the prior facsimile data from the list with the received facsimile data;
   generate generated identification image based on a first repository, the first repository being a location of the storage device storing the selected facsimile data;
   attach the generated identification image to the received facsimile data to generate identifiable facsimile data; and
   store the identifiable facsimile data in the first repository such that the identifiable facsimile data is associated with the selected facsimile data.

2. The non-transitory storage medium according to claim 1, wherein the identification image is a one-dimensional bar code or a two-dimensional bar code.

3. The non-transitory storage medium according to claim 1, wherein, the computer readable program, when executed, further configures the processor to,
   determine whether the processor is authorized to store the identifiable facsimile data in the first repository, and
   store the identifiable facsimile data in a second repository associated with the storage device, if the processor determines that the processor is unauthorized to store identifiable facsimile data in the first repository.

4. The non-transitory storage medium according to claim 3, wherein the computer readable program, when executed, further configures the processor to,
   create a correspondence table that defines a correspondence between the first repository and the second repository, if the processor stores the identifiable facsimile data in the second repository.

5. The non-transitory storage medium according to claim 1, wherein the computer readable program, when executed, configures the processor to,
   attach the generated identification image to a facsimile transmission cover sheet associated with the received facsimile data, a facsimile transmission report associated with the received facsimile data, or inside a facsimile document associated with the received facsimile data.

6. The non-transitory storage medium according to claim 1, wherein the computer readable program, when executed, further configures the processor to,
   store the identifiable facsimile data together with at least one of identification information for identifying a user, transmission or reception time of the received facsimile data, and information on a destination or a source of the received facsimile data.

7. A facsimile device configured to communicate with an information processing device through a network, the facsimile device comprising:
   a receiver configured to receive facsimile data;
   a memory containing computer readable code; and
   a processor configured to execute the computer readable code to,
      determine if an identification image is included in the received facsimile data,
      display a list including at least one item of prior facsimile data stored in a storage device, if the processor determines that the identification image is not included in the facsimile data,
      receive an instruction to associate a selected one of the prior facsimile data from the list with the received facsimile data,
      generate generated identification image based on a first repository, the first repository being a location of the storage device storing the selected facsimile data,
      attach the generated identification image to the received facsimile data to generate identifiable facsimile data, and
      store the identifiable facsimile data in the first repository such that the identifiable facsimile data is associated with the selected facsimile data.

8. The facsimile device according to claim 7, wherein the identification image is a one-dimensional bar code or a two-dimensional bar code.

9. The facsimile device according to claim 7, wherein, the computer readable program, when executed, further configures the processor to, determine whether the processor is authorized to store the identifiable facsimile data in the first repository, and store the identifiable facsimile data in a second repository associated with the storage device, if the processor determines that the processor is unauthorized to store identifiable facsimile data in the first repository.

10. The facsimile device according to claim 9, wherein the computer readable program, when executed, further configures the processor to, create a correspondence table that defines a correspondence between first repository and the second repository, if the processor stores the identifiable facsimile data in the second repository.

11. The facsimile device according to claim 7, wherein the computer readable program, when executed, configures the processor to, attach the generated identification image to a facsimile transmission cover sheet associated with the received facsimile data, a facsimile transmission report associated with the received facsimile data, or inside a facsimile document associated with the received facsimile data.

12. The facsimile device according to claim 7, wherein the computer readable program, when executed, further configures the processor to, store the identifiable facsimile data together with at least one of identification information for identifying a user, transmission or reception time of the received facsimile data, and information on a destination or a source of the received facsimile data.

13. A communication system comprising:

an information processing device; and a facsimile device configured to communicate with the information processing device, the facsimile device including, a receiver configured to receive an input of facsimile data, and a processor configured to, determine if an identification image is included in the received facsimile data, display a list including at least one item of prior facsimile data stored in a storage device, if the processor determines that the identification image is not included in the facsimile data, receive an instruction to associate a selected one of the prior facsimile data from the list with the received facsimile data, generate generated identification image based on a first repository, the first repository being a location of the storage device storing the selected facsimile data, attach the generated identification image to the received facsimile data to generate identifiable facsimile data, and store the identifiable facsimile data in the first repository such that the identifiable facsimile data is associated with the selected facsimile data.

* * * * *